June 22, 1965 N. N. RUBIN 3,190,460

AIRBORNE CARGO-HANDLING AND TIE-DOWN SYSTEM

Filed March 4, 1963

INVENTOR.
NORMAN N. RUBIN

BY

ATTORNEY

United States Patent Office 3,190,460
Patented June 22, 1965

3,190,460
AIRBORNE CARGO-HANDLING AND TIE-DOWN SYSTEM
Norman N. Rubin, Silver Spring, Md., assignor to the United States of America as represented by the Secretary of the Navy
Filed Mar. 4, 1963, Ser. No. 262,805
11 Claims. (Cl. 214—1)
(Granted under Title 35, U.S. Code (1952), sec. 266)

The invention described herein may be manufactured and used by or for the Government of the United States of America for governmental purposes without the payment of any royalties thereon or therefor.

This invention relates to a cargo-handling and tie-down system and more particularly to a valved pneumatic system for both facilitating movement of cargo along the conveying structure and for precluding movement within the same, as during transit.

Present cargo-carrying aircraft employing cargo-handling equipment such as rollers, cargo cages, and other restraining devices have developed serious weight problems due to the nature of the equipment used. Also, the use and application of the equipment has been found time consuming beyond minimum acceptable standards. In addition, there are many separate parts to misplace or get lost or malfunction. Straps or nets must be fastened in place and fastened over the cargo; or cargo cages erected around the cargo to restrain it. Conveyor rollers must be installed and removed as need dictates.

It therefore is an object of the present invention to provide a simple and lightweight cargo-handling and tie-down system; one that employs a minimum of parts which may become misplaced and one which utilizes a minimum of time in use and application.

Another object of this invention is to provide a combined cargo-handling and tie-down system which is inexpensive in manufacturing, maintenance and installation costs.

Various other objects and advantages will appear from the following description of an embodiment of the invention and the novel features will be particularly pointed out hereinafter in connection with the appended claims.

Figure 1:
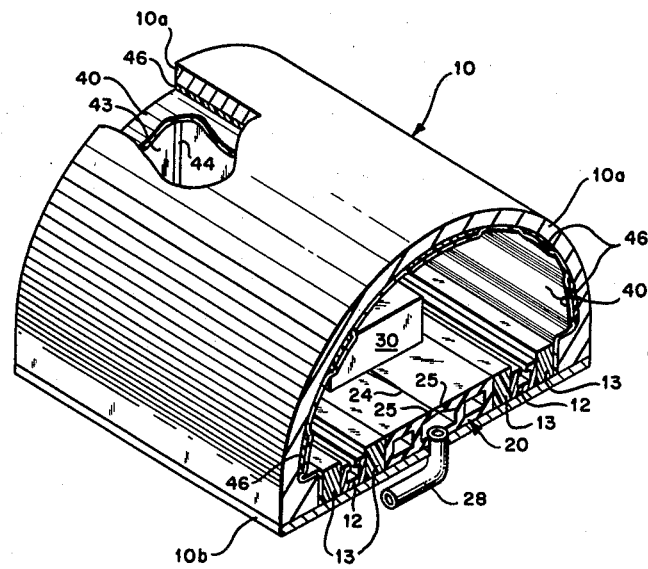
FIG. 1 is a pictorial view in cross-section illustrating the components of the cargo-handling and tie-down system with a cutaway section of the loading end provided to illustrate the nonmetallic zipper.

Referring to FIG. 1, it is seen that the cargo-handling and tie-down system is generally housed in a conveying enclosure generally noted by reference numeral 10. Although the present embodiment illustrates the container to be the cabin of a cargo-carrying aircraft, it is contemplated that a railroad freight car body, a cargo-carrying road vehicle or a separate freight-carrying container may be utilized. The conveying enclosure 10 includes, in addition to side walls 10a, a flooring member 10b for supporting a pair of standard metal rails 12 utilized for tie-down of chair legs, litter stanchions, or troop seats, and for supporting the spacer elements 13 disposed adjacent the metal rails 12 which act as a lateral confining means for the adjacent load-bearing unit generally noted at 20.

Figure 2:
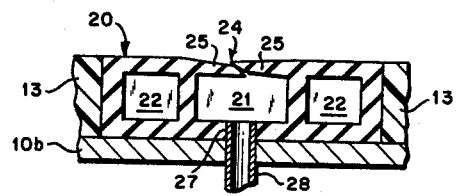
FIG. 2 is a cross sectional view of the load-supporting unit in the static position.

Referring again to FIG. 1 and more particularly to FIG. 2, the load-bearing unit 20 is illustrated as extending longitudinally of the length of the conveying enclosure 10 and although one such load-bearing unit is illustrated in FIG. 1 it is contemplated that a plurality of such units may be utilized. The load-bearing unit 20 is constructed of an elastic, incompressible, and deformable material and is rectangular in cross section having a centrally located interior passage or channel 21 and a pair of laterally spaced parallel extending pressure relief holes 22 thereby forming side walls 23 between the passage 21 and holes 22. The upper portion of the interior passage 21 has an angularly disposed slit indicated at 24 extending the length of the load-bearing unit 20 and forming a pair of lips 25 which normally seals the interior passageway 21. The lower surface of the passageway 21 is formed with an aperture 27 which permits a pipe or conduit 28 to have access to the interior passageway 21. This pipe or conduit 28 is connected at the other end thereof, not shown, to a source of air under pressure and selectively to a means for withdrawing the air within the passage. It is contemplated by this invention that the source of pressure for pressurizing the aircraft cabin may be utilized as the means for supplying the air to the pipe or conduit 28.

Referring now to FIG. 2, the lips 25 sealing the passageway or channel 21 are shown in the static position, that is, with no external forces being applied as by cargo or by the air under pressure or suction.

Figure 3:
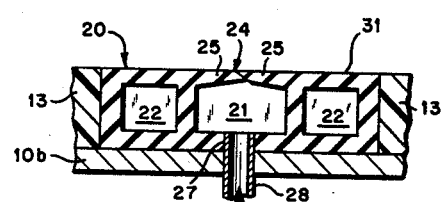
FIG. 3 is a cross-sectional view of the load-supporting unit in the pressurized position.

Referring now to FIG. 3, the load-bearing unit 20 is shown in the pressurized condition, that is, where air under pressure is being applied from a source through conduit 28 to the channel 21. The lips 25 are urged by the pressurized air from the position shown in FIG. 2 to the position shown in FIG. 3 wherein the channel is positively secured and forms an airtight chamber. The condition shown in FIG. 3 is that which exists just prior to the time of loading cargo into the conveying enclosure.

Figure 4:
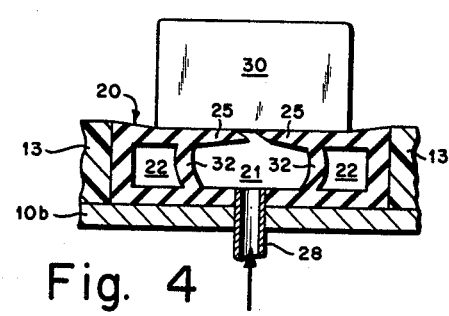
FIG. 4 is a cross-sectional view of the load-supporting unit in the loaded position.

With reference to FIG. 4, it is seen that when the cargo is brought into the conveying enclosure and a load, such as indicated by reference numeral 30, is applied locally to the cargo-bearing surface 31 of the unit 20 the side walls 23 formed between passage 21 and relief holes 22 buckle as in columnar action and flow within the area of the pressure relief holes 22. The resultant of the forces applied by the load 30 and the forces applied by the pressurized air entering the passage 21 and acting laterally against the side walls 23 cause the lips 25 to separate sufficiently to allow the escape of the pressurized air. The amount of air escaping and the pressure thereof is sufficient to form an "air film" upon which the load 30 may float or slide without any appreciable frictional forces being developed between the load 30 and the load-bearing face 31 of the unit 20. As soon as the load slides longitudinally to an adjacent area the lips return to the condition shown in FIG. 3, seal the load-bearing unit, and again form an airtight chamber in the areas not directly under the load 30. Therefore, it is readily seen that the present invention obtains a selective and localized air bearing support for the load being transferred through the conveying enclosure.

Figure 5:
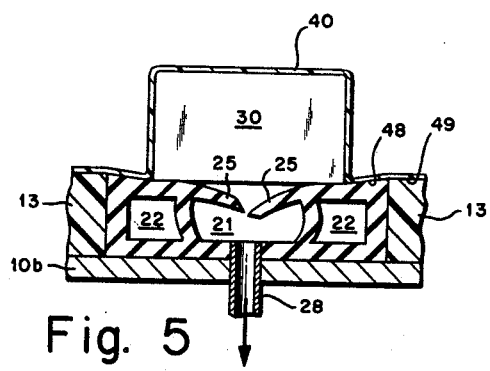
FIG. 5 is a cross-sectional view of the load-supporting unit in the restraining position with the load enshrouded by the flexible sheet.

Referring now to FIGS. 1 and 5, the embodiment illustrated therein illustrates the cargo tie-down aspect of the present invention. As most clearly shown in FIG. 1, the conveying enclosure 10 has a thin plastic sheet 40 enclosed therein made of a molecularly adhesive material and in the order of one-eighth of an inch in thickness, shaped to conform to the inside of the conveying enclosure cemented or otherwise appropriately secured along the edges thereof to the flooring member 10b as at 42. The ends of the plastic sheet 40, only one being shown at 43 in FIG. 1, may be closed by nonmetallic "zippers" 44 secured to the end edges thereby obtaining an airtight plastic envelope about the interior of the conveying enclosure 10. In order to retain the plastic sheet 40 against the side walls 10a of the conveying enclosure 10 during the entry of cargo within enclosure, a plurality of strips or patches of plastic material 46 are affixed to the enclosure side walls by cement or other appropriate material. When the plastic envelope 40 is brought into contact with the strips or patches 46 the plastic sheet will adhere to the plastic strips by molecular adhesion.

Referring more particularly to FIG. 5, the plastic sheet 40 is illustrated enshrouding the load 30; the sheet being detached from the patches 46 and brought into engagement with the floor and load by the suction forces impressed upon the passageway 21 along the entire length thereof through the conduit 28. The arrow 29 indicates the direction of air flow obtained by apparatus known and used in the art and not shown. As clearly shown by this figure, the sheet 40 is in contact with the load-bearing face 31 of unit 20 and spacer element 13 at 48 and 49, respectively. When the surface 31 and spacer element 13 are constructed of a plastic material, the load 30 is restrained by the molecular adhesion of the sheet 40 to the contacting surfaces in addition to the suction effect of the floor slots in holding the load.

It is contemplated by the present invention that the load-bearing surface 31 may be formed, by coating or other appropriate means, with a plastic surface offering a low coefficient of friction and creating a molecular adhesive contact with the plastic sheet 40 when the same is draped about the load 30 in the tie-down arrangement. It should further be noted that the material used in the load-bearing unit 20 may be such as to provide the above-mentioned characteristics.

The description of the operation of the present invention is as follows:

Prior to the loading of the conveying enclosure 10 the plastic envelope 40 is inflated by external pressure not shown, as for example cabin pressure in a cargo-carrying aircraft, and is affixed to the side walls 10a of the conveying enclosure 10 by the interaction of the plastic envelope 40 and the strip or patches 46 by molecular adhesion. The plastic enclosure is then unzippered at its loading end 43 and cargo is introduced upon the load-bearing unit 20. At this time the interior passage 21 is placed under pressure from entering gas or air passing through the pipe 28 which pressure seals the lips 25 as shown in FIG. 3. Upon the entry of cargo 30 upon the load-bearing unit 20, a localized bending of the side walls 23 and separation of the lips 25 will occur allowing the outer emission of the pressurized air or gas thereby providing an air bearing or "air cushion" upon which cargo 30 may ride. As the cargo proceeds through the conveying enclosure the load-bearing unit 20 will seal itself in those areas previously traversed and will simultaneously open to provide a localized air cushion in those areas upon which the cargo 30 is moved. After the enclosure 10 is properly loaded the nonmetallic zipper 44 is actuated to form an airtight chamber or plastic envelope surrounding the load. At this time a reverse form or suction is applied through the conduit 28 to the passage 21 which in turn causes the lips 25 of the load-bearing unit 20 along the entire length thereof to open as shown in FIG. 5 and causes the plastic envelope to be pulled from its attachment to the strips 46 and to be pulled down over the cargo and floor and in contact therewith. In this position the cargo is restrained or "tied down" by the combination of forces of the enshrouding action of the plastic envelope, of the suction/air pressure pushing the load down on the floor, and the molecular adhesion of the plastic envelope 40 and the material of the load-bearing unit 20 and spacers 13.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A cargo-handling unit for supplying air bearing at the load comprising:
    an elongated load-supporting member of an elastic, incompressible, and deformable material having an outer load-bearing face and confined side and bottom faces,
    said member including an interior passageway extending approximately lengthwise of the member for receiving gas under pressure and a relief space extending parallel to and adjacent said interior passageway forming a side wall,
    said member having a slit along its length angularly extending from said interior passageway to said load-bearing face thereby providing over-running lips which normally in contact seal said slit; whereby when a load is applied to said member said side wall collapses beneath the load with said relief space spreading said lips sufficiently to allow the gas under pressure to escape and act against the load.

2. A cargo-handling unit for supplying an air bearing at the load comprising:
    an elongated load-supporting member of an elastic, incompressible and deformable material having an outer load-bearing face and confined side and bottom faces,
    said member including an interior passageway for receiving gas under pressure and a pair of relief passages one at each side of said interior passageway, each passage being laterally spaced from and extending parallel to said interior passageway with a side wall between each passage and said passageway,
    said member having a slit in its wall having said load-bearing face, running in the same direction as said interior passageway and angularly extending from said interior passageway to said load-bearing face thereby providing overrunning lips which normally seal said passageway when no load is on said load-bearing face; whereby when a load is applied to said member said side walls beneath the load collapse within said relief apertures, spreading said lips sufficiently to allow the gas under pressure to escape and act against the load as a gas bearing for the load.

3. A cargo-handling unit for supplying air bearing at the load comprising:
    an elongated load-supporting member of an elastic, incompressible and deformable material having an outer load-bearing face and confined side and bottom faces,
    said member including an interior passageway for receiving gas under pressure and a plurality of relief apertures, each aperture being laterally spaced from and adjacent to said interior passagaway thereby forming a side wall between each aperture and said passageway,
    said member having a slit in its top wall that provides the load-bearing face extending angularly from said interior passageway to said load-bearing face and providing over-hanging lips, said lips being normally in contact to close the interior passageway at the slit but is openable immediately below the load by deformation of the wall when the load is applied; whereby when the load is applied the gas under pressure escaping through the opened slit beneath the load provides an air bearing for the load thereby substantially reducing the frictional forces between the load and said member.

4. A cargo-handling unit for supplying air bearing at the load comprising:
    an elongated load-supporting member of an elastic, incompressible and deformable material having an outer load-bearing face and confined side and bottom faces, said member including a normally closed interior passageway for receiving gas under pressure and a plurality of relief spaces separate from said passageway, such spaces being laterally spaced from and adjacent to the sides of said interior passageway thereby forming a side wall partition between each space and said passageway, said member having a slit in its top, load-bearing wall from face to face therethrough and oblique to the exterior face of said load-bearing wall extending forming the laterally overlapping and normally contacting lips, the load-bearing wall of said member being deformable under the pressure from a load to separate said lips in the area beneath said load, said lips being normally closed when said passageway contains gas under pressure and openable when a load is applied to said member to provide an air bearing for the load which substantially reduces the frictional forces between the load and the outer bearing face.

5. A cargo-handling unit for supplying air bearing at the load comprising:

an elongated load-supporting member of an elastic, incompressible and deformable material having an outer load-bearing face and confined side and bottom faces, said member including an interior passageway for receiving gas under pressure and a plurality of separate, internal relief spaces, such spaces being laterally spaced from and adjacent to both sides of said interior passageway thereby forming a flexible side wall between each space and said passageway, said member having a slit through its top, load-bearing wall extending obliquely from said interior passageway to said load-bearing face and forming overlapping but normally contacting lips, the top wall of said member being deformable under load to separate said lips, means operatively associated with said member for supplying gas under pressure to said interior passage, said lips being normally closed when said passageway contains gas under pressure and openable beneath a load when a load is applied to said member; whereby the gas under pressure in said passageway provides an air bearing for the load which substantially reduces the frictional forces between the load and said outer bearing face.

6. A cargo tie-down apparatus for use in a cargo-carrying enclosure having means associated therewith for withdrawing the air from the enclosure comprising:

a load-supporting floor having at least one passage extending therethrough by which air in the enclosure may be withdrawn, a thin, impermeable, flexible, molecularly adhesive sheet having the edges thereof formed for connection to the enclosure across said passage for forming with the enclosure a closed envelope about any cargo on said floor, and means communicating with said aperture for removing the air entrapped within said envelope and about said cargo; whereby when air is withdrawn from said enevlope said sheet will be drawn to and enshroud the cargo and secure the same against movement.

7. A cargo-handling and tie-down apparatus comprising:

an elongated load-supporting member of an elastic, incompressible and deformable material having an outer load-bearing face and including a plurality of separate chambers extending along the length thereof below said load-bearing face, said member including a slit extending obliquely from one of said chambers to said load-bearing face thereby providing overrunning flexible, elastic and normally contacting lips which normally close that chamber, a thin, impermeable, flexible, molecularly adhesive sheet having the edges thereof connected to said load-supporting member and forming with said member an envelope about the cargo, and means for selectively supplying air under pressure to said one chamber to provide an air bearing beneath any load on said member over said one chamber, and for withdrawing air from said chamber to cause contacting of said sheet closely to said cargo and confine the cargo against displacement on said floor.

8. A cargo-handling and tie-down apparatus comprising:

an elongated load-supporting member of an elastic, incompressible, and deformable material having an outer load-bearing face and confined side and bottom faces, said member including an interior closed passageway for receiving gas under pressure and a separate and non-communicating relief space extending parallel to and adjacent said interior passageway with a partition side wall between them, said member having a slit extending from said interior passageway obliquely to said load-bearing face and thereby providing overrunning but normally contacting lips which normally seals said passageway, a thin, flexible, impermeable, molecularly adhesive sheet having the edges thereof connected to said load-supporting member and forming with said member an envelope about the cargo, and means secured to said load-supporting member and communicating with said interior passageway for supplying air thereto when cargo is to be moved on said member and for removing the air entrapped within said envelope when the cargo is in place; whereby when air is removed from said envelope said sheet enshrouds the cargo and secures the same against movement.

9. A cargo load handling device comprising:

an elongated load-supporting member of an elastic, incompressible and deformable material, and having therein a pressure chamber extending for substantially its length, closed at its ends and having a slit in its top, load-bearing wall for substantially the length of the chamber, with the slit oblique to the top surface of the member and providing a mutual overlap and normal contact of the lips of a top wall at opposite sides of the slit, means by which air under pressure may be supplied to said pressure chamber, said member having therein spaces arranged along opposite sides of and separate from said chamber and spaced from said chamber by flexible walls forming the sides of said chamber, whereby when a load is placed on said top wall of said member and moved along it in a lengthwise direction, and air under pressure is present in said chamber, the load will flex downwardly that part of the top wall of the chamber then beneath the load and open the portion of the slit then beneath the load, permit the escape of air from said chamber beneath the load and provide an air-bearing beneath the load to reduce the force requirement to move the load along said member.

10. A cargo load handling device, comprising:

an elongated load-supporting member of an elastic, incompressible and deformable material, and having therein a closed pressure chamber extending at least for substantially that part of its length thereof over which a cargo load may be moved, closed at its ends and having in its top, load-bearing wall a slit oblique to the upper surface of said wall and providing mutually overlapping and normally contacting lips at the slit, means abutting the sides and bottom of said member for confining them against outward movement when a load rests on said load-bearing wall, said member having spaces along and separate from the sides of said chamber with flexible side walls between such spaces and said chamber, and means by which air under pressure may be supplied to said chamber, whereby when air under pressure is supplied to said chamber and a load is placed on said member and pushed along it in a direction lengthwise of the member the weight of the load will flex the top wall downwardly to open the portion of the slit beneath the load and let air escape from said chamber beneath the load and provide an air-bearing for the load.

11. A cargo-handling device comprising:

an elongated load-supporting member of an elastic, incompressible and deformable material, with an internal closed pressure chamber extending along its length at least for substantially that part of such length over which a load may be moved, closed at its ends and having a flexible top, load-bearing wall with a slit through that wall from face to face thereof which is oblique to the upper face of such wall, providing mutually overlapping and normally contacting lips at the slit, means by which air under pressure may be supplied to said chamber, and stiffening means contacting the sides and bottom walls of said member, whereby when air under pressure is supplied to said chamber and a load is placed on said top wall of said member and pushed along it in a direction lengthwise of the member, the weight of the load on the top wall will flex that wall downwardly to open the portions of the slit beneath the load and let air escape from said chamber beneath the load and provide an air bearing beneath the load progressively along the member during the movement of the load.

References Cited by the Examiner

UNITED STATES PATENTS

| | | | |
|---|---|---|---|
| 670,794 | 3/01 | Lott | 137—525.1 |
| 2,402,781 | 6/46 | Schreiber | 137—525.1 X |
| 2,548,057 | 4/51 | Prati | 105—369 |
| 2,730,968 | 1/56 | Faus | 105—369 |
| 2,835,596 | 5/58 | Kaufman. | |
| 2,907,580 | 10/59 | Tietig | 280—179 |
| 2,918,183 | 12/59 | Petersen | 214—1 |
| 3,000,418 | 9/61 | Bitting. | |
| 3,081,886 | 3/63 | Flexman | 214—1 |
| 3,089,436 | 5/63 | Buckley | 105—369 |
| 3,108,698 | 10/63 | Petersen | 214—1 |

HUGO O. SCHULZ, *Primary Examiner.*

CLAUDE A. LE ROY, MARVIN A. CHAMPION,
*Examiners.*